W. J. TOWER.
ROTARY ENGINE.
APPLICATION FILED FEB. 26, 1918.

1,272,728.

Patented July 16, 1918.
2 SHEETS—SHEET 1.

INVENTOR
WILLIE J. TOWER
BY
Frank Warren
ATTORNEY

W. J. TOWER.
ROTARY ENGINE.
APPLICATION FILED FEB. 26, 1918.

1,272,728.

Patented July 16, 1918.
2 SHEETS—SHEET 2.

INVENTOR
WILLIE J. TOWER
BY
Frank Warren
ATTORNEY

UNITED STATES PATENT OFFICE.

WILLIE J. TOWER, OF SEATTLE, WASHINGTON.

ROTARY ENGINE.

1,272,728.  Specification of Letters Patent.  Patented July 16, 1918.

Application filed February 26, 1918. Serial No. 219,317.

*To all whom it may concern:*

Be it known that I, WILLIE J. TOWER, citizen of the United States, residing at Seattle, in the county of King and State of Washington, have invented a certain new and useful Improvement in Rotary Engines, of which the following is a specification.

My invention relates to improvements in rotary engines and the object of my invention is to provide an engine that is of simple form of construction that will run with comparatively no vibration and that is capable of developing a high efficiency in proportion to the amount of fuel consumed.

A further object of my invention is to provide an engine that may be adapted by relatively slight changes to be used either as an internal combustion engine or a steam engine.

A still further object of my invention is to provide an engine of this class that is reversible and that will operate as smoothly and develop an equal amount of power while running in either direction.

My invention consists in the novel form of construction, adaptation and combination of parts of a rotary engine as will be more clearly hereinafter described and claimed.

I accomplish these objects by devices illustrated in the accompanying drawings, wherein—

Figure 1:
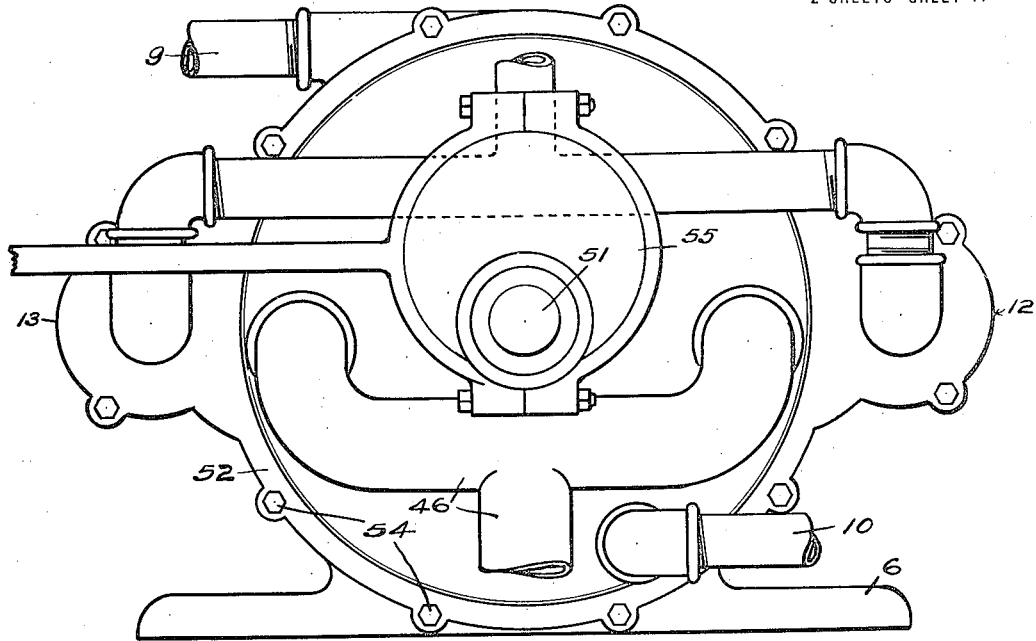
Figure 1 is a view in end elevation of a rotary engine constructed in accordance with my invention.

Referring to the drawings, throughout which like reference numerals indicate like parts, the numeral 5 designates a cylindrical casing mounted on an integral base 6 which cylindrical casing 5 is provided with an internal cylindrical bore that is adapted for the reception of a rotor designated by the numeral 7. Within the walls of the casing 5 are provided water jacket spaces 8 that are connected by suitable passageways with water inlet and outlet pipes 9 and 10, respectively, so that water may be caused to circulate around the rotor chamber, in a well known manner, to keep such chamber cool.

The rotor 7 is preferably formed of steel and is provided at three equidistant points around its periphery with integrally formed pistons or vanes 11 that extend lengthwise thereof and fit snugly against the interior walls of the casing 5.

Figure 3:
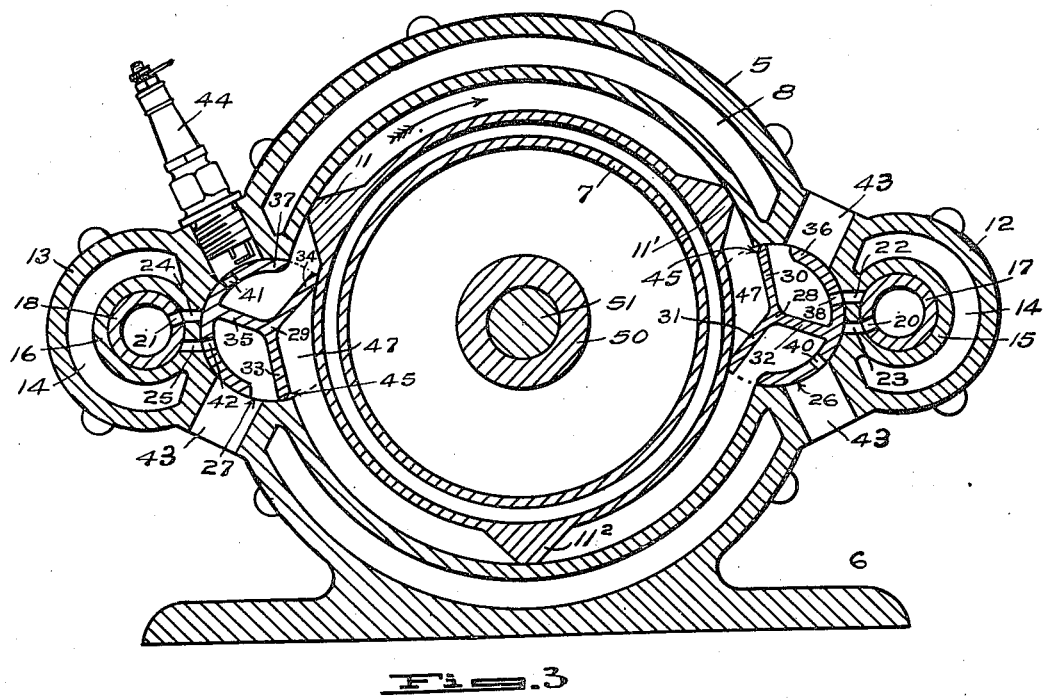
Fig. 3 is a view in cross-section on broken line 3, 3 of Fig. 2.

The vanes 11 when viewed in cross-section as shown in Fig. 3 are of frusto-conical shape with a relatively wide base that merges with the outer peripheral portion of the rotor wall and a relatively narrow tip that makes a gas tight running fit with the internal wall of the casing 5.

Disposed on diametrically opposite sides of the casing 5 and formed integral therewith are two valve chambers 12 and 13 that are each water jacketed as at 14 and are provided respectively with cylindrical valve chambers 15 and 16 within which are disposed tubular fuel inlet valves 17 and 18, said valves having longitudinal slots 20 and 21, respectively, that may selectively be caused to register with slots 22, 23, 24 and 25 in the walls of the valve chambers 15 and 16.

Disposed between the valve chambers 15 and 16 and the rotor 7 are other cylindrical valve chambers 26 and 27, respectively, within which are disposed oscillating valves 28 and 29 that are respectively formed with three radial partition walls 30, 31 and 32 and 33, 34 and 35, the walls 32 and 35 each merging at their outer extremity with integral semi-circular segments 36 and 37 that are provided with radial slots 38, 40, 41 and 42 that are adapted to register with the slots 22, 23, 24 and 25 and provide passageways for the inlet of fuel as the valves oscillate.

Communicating with each of the oscillating valve chambers 26 and 27 are two openings 43 that are adapted for the reception of spark plugs 44, of well known form, only one of which is shown in Fig. 3, the said openings 43 being located so that the slots 38, 40, 41 and 42 will register therewith when in one position in order that the fuel charge may be ignited.

The outer corners of the partition walls 30, 31, 33 and 34 are beveled as indicated at 45 so that they will fit more snugly against the rotor and will be less liable to be caught by the vanes 11 as they approach the valves.

From the foregoing description it will be seen that the oscillating valves constitute means for admitting a measured charge of fuel and also constitute explosion chambers in which the fuel charge may be ignited by the spark plugs 44 to drive the rotor.

Referring to Fig. 3, in which the rotor is moving in the direction of the arrow I have shown the position in which the various parts would be just as the explosion occurs in the left hand valve 29, the port 41 of such valve 29 in this position being open to the spark plug 44 whereby the charge may be ignited and the opening between the end of the segment 37 and the radial wall 34 registering with the interior annular space that separates the inner wall of the casing 5 from the outer wall of the rotor 7 so that the force of the explosion will be exerted against the adjacent vane 11 and will drive the rotor in a clockwise direction.

In this same position exhaust of the burned gases between the vanes 11 and the following vanes $11^2$ is taking place through a suitable exhaust pipe 46 that communicates at one end of the casing with the space 47 between the radial valve walls 33 and 34, while in the same position on the right hand side as shown in Fig. 3, the exhaust ahead of the vanes $11^1$ and the expansion behind the vanes $11^2$ are almost completed. From the above description it will be understood that the valves 28 and 29 must be moved quickly from the position shown in Fig. 3 to a position that will effect the registration of the ports 40 and 41 with the ports 23 and 24, respectively, while the vanes 11, $11^1$ and $11^2$ are passing under such valves and must further be moved quickly back to the initial or firing position just as the vanes have passed the valves. The mechanism for accomplishing this movement and for controlling and timing the spark is more clearly shown in Fig. 4 and will now be described.

The rotor 7 is rigidly connected with an axial sleeve 50 that is keyed to a shaft 51 that passes outwardly through two end plates 52 and 53 that are secured by tap screws 54 to the casing 5 so that the shaft will be driven at the same rate of speed as the rotor.

The shaft 51 is provided at one end with an eccentric 55 of well known form that may be used to drive a pump that compresses the fuel charge and is provided on its opposite end with a fixedly mounted bevel gear 56 that is disposed to mesh with two oppositely disposed bevel gears 57 and 58 each having one-third of the number of teeth of the larger bevel gear 56 so that one complete rotation of the large bevel gear 56 will effect three complete rotations of each of the smaller bevel gears 57 and 58.

The bevel gears 57 and 58 are mounted on shafts 60 and 61, respectively, that are journaled in bearings 62 on a yoke 63 and are provided on their outer ends with cam disks 64 and 65 having suitably arranged curved cam portions 66 and disposed so that their peripheries project between two rollers 67 on disks 68 that are secured to the outer end of shafts 70 that are rigidly connected with the oscillating valves 28 and 29.

From the above description it will be apparent that the valves 28 and 29 will be oscillated every time the shafts 57 and 58 are turned through one complete revolution and that such valves will be oscillated three times every time the rotor 7 makes one complete revolution.

The disks 68 also each carry a contactor 71 that is adapted to make a contact with another contactor 72 just as the valve oscillation is completed and cause a spark to be made in the firing chamber of its respective valve.

The contactor 72 is connected with a wire 73 through which current may pass to produce the spark.

The yoke 63 is pivotally mounted to turn about the same center as the shaft 51 and is provided with a fixed bracket 74 that is pivoted to one end of a link 75 the other end of the link 75 being secured by a common pivot to the upper end of a shorter link 76 and to the end of a control arm 77.

The lower end of the shorter link 76 is mounted on a fixed pivot 78 on the head 53 so that when the control arm 77 is moved endwise the yoke 63 will be turned about the shaft 51 thus moving the cam disks 64 and 65 into different positions.

Figure 4:
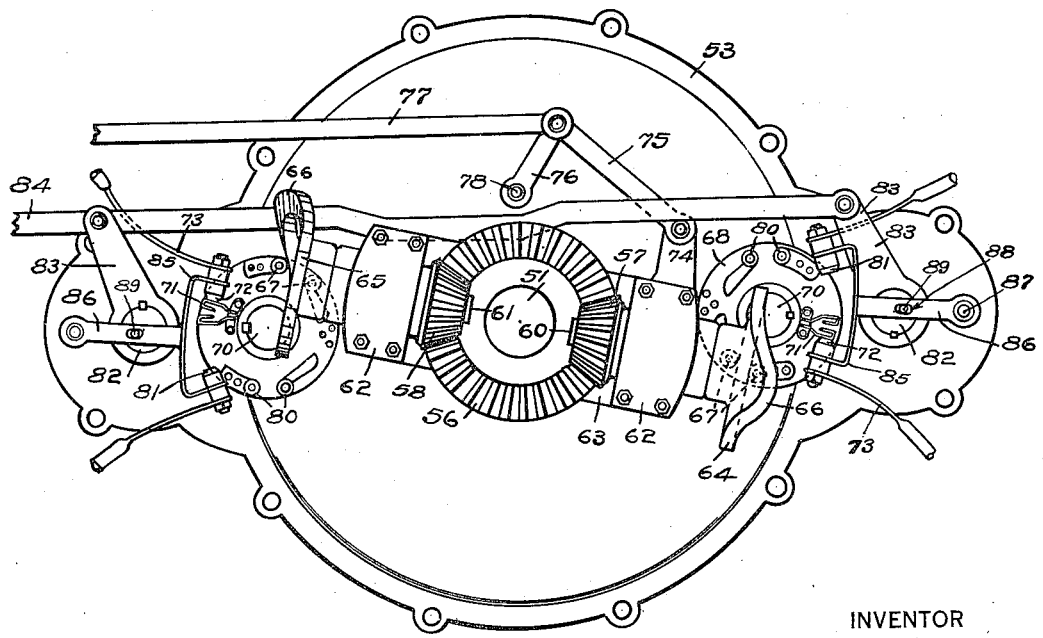
Fig. 4 is a view in elevation of the end opposite to the one shown in Fig. 1 illustrating the valve operating and spark timing devices.

The disks 68 are provided at a point that is not exactly diametrically opposite the rollers 67 with two other rollers 80 between which the peripheral portions of the cam disks 64 and 65 may be caused to project by moving the control arm 77 to the left as shown in Fig. 4 and turning the yoke 63 in a contra-clockwise direction through a small angle about the shaft 51, the effect of such movement being to change the relative time of oscillation of the valves so that they move at the proper instants of time to admit fluid fuel and permit exhaust when the direction of rotation of the rotor is reversed.

The variation in movement of the disks 68 caused by changing the position of the yoke 63 will cause the contactor 71 to make a contact at predetermined intervals with another contactor 81 instead of making contact with the contactor 71 and thereby cause the spark to be delivered at the proper instant of time through a different set of spark plugs.

Figure 2:
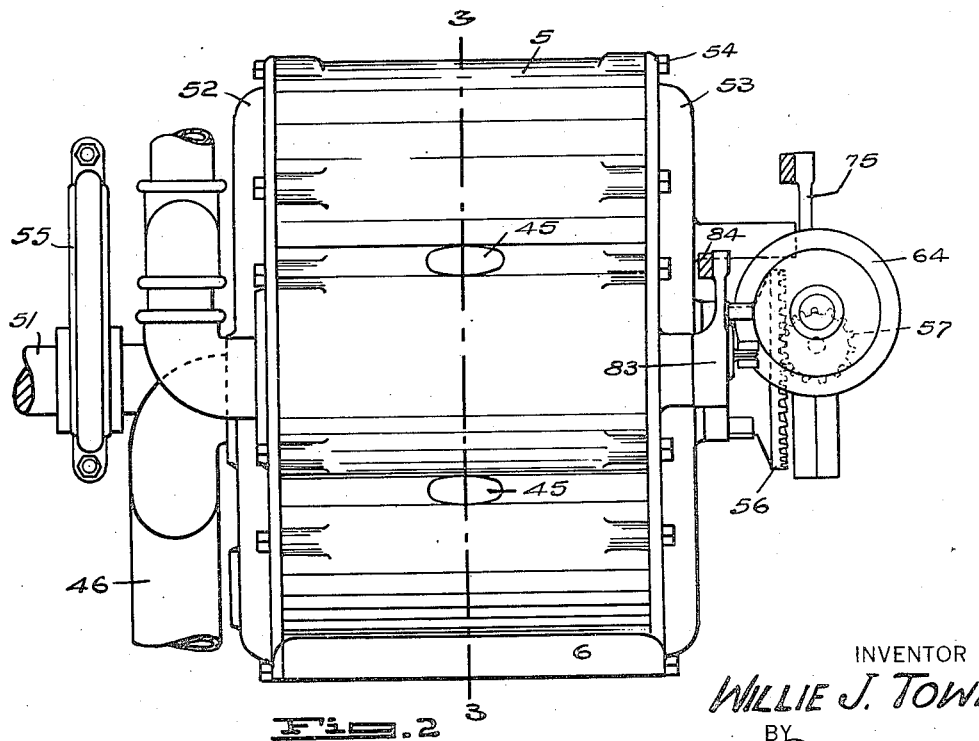
Fig. 2 is a view in side elevation of the same.

The tubular valves 17 and 18 terminate in solid end portions 82 that project outwardly through the end plate 53 and have lever arms 83 fixedly secured thereto, the top ends of the lever arms 83 being pivotally connected with a link 84 by which they may be moved to rotate the tubular valves 17 and 18 and cause the slots 20 and 21 to register with the slots 22 and 25 instead of with the slots 23 and 24 as shown more clearly in Fig. 2.

The contactors 72 and 81 on each side are both carried on a bracket 85 that is secured to the end plate 53 by pivots 87 and are provided with slots 88 that fit over eccentric pins 89 in the ends of the tubular valve shafts 82 so that when the position of the tubular valves are changed the positions of the contactors will be changed also.

Obviously, to start the engine it is only necessary to impart reciprocatory movement to the link 74 and thereby oscillating the valves 28 and 29 first into the charging position to permit the explosion chambers to receive a charge of fuel and then into the firing position to cause the spark to be delivered and fuel ignited. It will thus be seen that where this form of engine is used an engine starter will not be necessary.

It is manifest that this engine can be easily reversed by changing the position of the tubular valves 17 and 18 and changing the relative time oscillation of the valves 28 and 29 and changing the spark connections and timing mechanism, all of the above operations being accomplished by shifting the arms 77 and 84.

When this engine is used as a steam engine the spark plugs and timing apparatus will be dispensed with and the steam under pressure admitted directly to the tubular valves 17 and 18.

Obviously, many changes may be made in the forms, dimensions and arrangement of parts of my invention without departing from the spirit thereof.

What I claim is:

1. A rotary engine comprising a casing having a cylindrical chamber, a rotor disposed therein in concentric relation thereto, vanes extending lengthwise of the outer peripheral wall of said rotor and adapted to make a gas tight sliding contact with the interior wall of said casing, valve casings formed at diametrically opposite points in said main casing each of said valve casings having two valve chambers formed therein that communicate with each other by two separate spaced apart slots, a hollow tubular valve disposed in one of said chambers in each of said valve casings said tubular valves each having a slot that is adapted to register with one of said spaced apart slots, fuel inlet means connected with said tubular valves, means for moving said tubular valves simultaneously, an oscillating valve disposed in one of said valve chambers in each of said valve casings, each of said oscillating valves having three radial partition walls and a semicircular segment connected with one of said partition walls and terminating in spaced relation from the said other two partition walls to form explosion chambers and the said semicircular segment having slots that are adapted to communicate with said fuel inlet slots, ignition devices communicating with said oscillating valve chamber, means connected with said rotor for oscillating said valve and exhaust pipes connected with the valve chambers in which said oscillating valves are disposed.

2. A rotary engine comprising a casing having a cylindrical chamber therein that is open at both ends, end plates adapted to close said two ends, a rotor disposed within said casing, vanes arranged lengthwise thereof and projecting outwardly from the periphery of said rotor said vanes having wide base portions and tapering toward their outer edges, an axial shaft disposed within said rotor and rigidly secured thereto said shaft projecting outwardly through both of said end plates, valve casings formed at diametrically opposite points in said casings each of said valve casings having two valve chambers formed therein that are connected with each other by two separate spaced apart slots, a hollow tubular valve disposed in one of said chambers in each of said valve casings said tubular valves each having a slot that is adapted to register with one of said spaced apart slots, fuel inlet means connected with said tubular valves, means for moving said tubular valves simultaneously, an oscillating valve disposed in one of said valve chambers in each of said valve casings each of said oscillating valves having three radial partition walls and a semicircular segment connected with one of said partition walls and terminating in spaced relation from the said other two partition walls to form explosion chambers and the said semicircular segment having slots that are adapted to communicate with said fuel inlet slots, ignition devices communicating with said oscillating valve chamber, means connected with said rotor for oscillating said valve and exhaust pipes connected with the valve chambers in which said oscillating valves are disposed.

In witness whereof, I hereunto subscribe my name this 20th day of February A. D. 1918.

WILLIE J. TOWER.